United States Patent
Wu

(10) Patent No.: US 7,154,745 B1
(45) Date of Patent: Dec. 26, 2006

(54) LOCK FOR LCD PANEL OF ELECTRONIC DEVICE

(75) Inventor: Yaz-Tzung Wu, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/193,467

(22) Filed: Aug. 1, 2005

(51) Int. Cl.
*G06F 1/16* (2006.01)
*H01R 13/62* (2006.01)

(52) U.S. Cl. .................. 361/681; 312/222; 439/159

(58) Field of Classification Search ............. 312/223.2, 312/222, 327, 329; 296/181, 168; 439/159, 439/157; 361/679–687, 724–727
See application file for complete search history.

(56) References Cited

U.S. PATENT DOCUMENTS

| | | | |
|---|---|---|---|
| 5,740,012 A * | 4/1998 | Choi | 361/686 |
| 5,997,323 A * | 12/1999 | Youn | 439/159 |
| 7,050,295 B1 * | 5/2006 | Kang | 361/683 |

* cited by examiner

*Primary Examiner*—Hung Van Duong
(74) *Attorney, Agent, or Firm*—Bacon & Thomas, PLLC

(57) ABSTRACT

The present invention is to provide a lock mountable on an LCD panel of an electronic device, which comprises a latch, a linking member adapted to have its both ends inserted into a first slot and a second slot of the latch; and a knob including a latching member projected from its side surface and being adapted to insert through a through hole of the latch to fasten the knob and the latch together. By utilizing this lock, a user may slide the knob to move the lock toward either direction with the torsion spring or the helical spring being compressed or expanded.

6 Claims, 5 Drawing Sheets

LOCK FOR LCD PANEL OF ELECTRONIC DEVICE

FIELD OF THE INVENTION

The present invention relates to locks, more particularly to an improved lock mountable on an LCD panel of a portable electronic device (e.g., notebook) as a detachable one, which is adapted to assemble together thereafter. This not only enables the lock to accommodate the size of the LCD panel but also enables the lock to have a double hook arrangement or a single hook arrangement. Hence, not only the number and types of the lock molds are decreased for reducing the manufacturing cost but also the management of spare parts, materials, and products is simplified.

BACKGROUND OF THE INVENTION

A wide variety of portable electronic devices such as notebooks are commercially available in fast pace due to the fast progress in network and communication technologies in recent years. Also, these electronic devices are inexpensive, compact, slim, and easy to carry. Further, these electronic devices not only fulfill the needs of wireless communication of people but also fulfill the needs of entertainment and data processing in our daily life. Thus, chances of using the portable electronic devices are increased gradually. This is particularly true for people living in bustling city life. In addition, more and more additional features are incorporated in the portable electronic devices due to rapid progress of electronics technology. Thus, latest models of portable electronic devices have many features far more advanced than their prototypes. Typically, these once additional features are necessary by the standard now.

For notebooks available from many manufacturers, an LCD (liquid crystal display) is typically mounted on a panel thereof. The panel has a size varied as designs or demands of customers. For example, a panel may have a size of 17.1", 15.4", 12.1", or 8.1". For a panel having one of the above sizes, a hook is projected therefrom. Hook may be provided in the form of single or double depending sizes of panels. The hook is operative to move by manipulating a latch. The hook may insert into a corresponding hole on a case of a notebook for fastening. Thus, it is possible of preventing the LCD panel from being opened without permission by providing the hook and the corresponding hole and fastening the LCD panel.

A perspective view of a notebook 10 incorporating above well-known characteristics in its LCD panel and case is shown in FIG. 1.

In FIG. 1, it is clearly seen that an LCD panel 11 is pivotably provided on a side of the notebook 10. Two spaced projecting hooks 12 (i.e., double hook configuration as shown in this type of notebook) are provided on one side of the LCD panel 11. A knob 13 is provided between the hooks 12 (i.e., on the side of the LCD panel 11 the same as that of the hooks 12). Internal portions of the knob 13 are formed within the LCD panel 11. The knob 13 has a latch 131 connected to both hooks 12. In operation, a user may slide the knob 13 toward one or the other direction to move the hooks 12 leftward or rightward.

Moreover, one or more hinges 14 are provided on the other side of the LCD panel 11. The hinges 14 are pivotably connected to one side of a case 15. In use, a user may pivot the LCD panel 11 about the hinges 14 to open or close the LCD panel 11. On top of the case 15 there are provided a keyboard 16 and a touch panel 17 both for input purposes.

Also, two spaced holes 18 are provided proximate the other side of the case 15. The holes 18 are disposed corresponding to the hooks 12. Thus, it is possible of preventing the LCD panel 11 from being opened without permission by providing the hooks 12 and the corresponding holes 18 and fastening the LCD panel 11.

As stated above, hook 12 may be provided in the form of single (not shown) or double depending sizes of LCD panels 11. However, a number of drawbacks have been found with respect to the configuration of hooks and holes as detailed below.

1. Many hook molds are required and this inevitably may not only increase the manufacturing cost but also increase difficulty of managing spare parts, materials, and products.

2. Different spring(s) is (are) required for cooperating with a single hook or double hook due to different designs. For example, a spring may be provided in the form of helical or torsion spring and thus its installation may differ significantly. This in turn may cause trouble to workers at assembly line in material selection.

3. It is possible that the workers at assembly line may make mistake in assembly. For example, hooks 12 of different sizes may mount in the LCD panel 11. Hence, a large gap may occur between either hook 11 and a corresponding hole 18 after fastening together.

Thus, the prior configuration of double hook 12 or single hook on the LCD panel 11 cannot satisfy the growing needs nowadays. Also, above drawbacks are common among manufacturers in assembling notebooks 10. In view of distribution and sales of notebooks 10 throughout the world and the competitive market, a notebook manufacturer cannot win over other competitive manufacturers if above drawbacks cannot be solved successfully. In other words, its competitiveness is lowered.

In view of the above (i.e., features of a notebook produced by one manufacturer are substantially the same as that produced by other manufacturers, it is concluded that if a notebook manufacturer wants to win over other competitive manufacturers it must provide notebooks with unique features. Thus, it is desirable among manufacturers to provide an improved lock for the LCD panel of a portable electronic device (e.g., notebook) without the above drawbacks in order to increase market competitiveness of the product.

SUMMARY OF THE INVENTION

After considerable research and experimentation, a lock for the LCD panel of an electronic device according to the present invention has been devised so as to have advantages of simplified hooks and decreasing the number and types of lock molds, and overcome the above drawbacks of the prior art. As stated in the background section, a hook may be provided in the form of single or double depending sizes of LCD panels. However, a number of drawbacks have been found including many hook molds being required, increased manufacturing cost, increased difficulty of managing spare parts, materials, and products, and causing trouble to workers at assembly line in material selection.

It is an object of the present invention to provide a lock mountable on an LCD panel of an electronic device including a case having a corresponding hole formed thereon for lockingly engaging the lock, the lock comprising a latch including a projected hook being perpendicular thereto, a through hole formed therein below the hook, a first slot and a pin both provided at its one end, a second slot provided at its other end, and an aperture provided proximate the second slot at the other end wherein either a torsion spring is put on the pin or a helical spring has a hook end fastened in the aperture; a linking member adapted to have its both ends inserted into the first slot and the second slot of the latch; and a knob including a latching member projected from its side surface, the latching member being adapted to insert through the through hole of the latch to fasten the knob and the latch together. By utilizing this lock, in operation a user may slide the knob to move the lock toward either direction with the torsion spring or the helical spring being compressed or expanded.

It is another object of the present invention to provide a lock mountable on an LCD panel of an electronic device including a case having a corresponding hole formed thereon for lockingly engaging the lock, the lock comprising first and second latches each including a projected hook being perpendicular thereto, a through hole formed therein below the hook, a first slot and a pin both provided at its one end, a second slot provided at its other end, and an aperture provided proximate the second slot at the other end wherein either a torsion spring is put on the pin of the first latch or a helical spring has a hook end fastened in the aperture of the second latch; a linking member including a positioning hole, the linking member being adapted to have its both ends inserted into the first slot of the first latch and the second slot of the second latch for forming a double hook arrangement; and a knob including a latching member projected from its side surface, the latching member being adapted to insert through the positioning hole of the linking member to fasten the knob and the linking member together. By utilizing this lock, in operation a user may slide the knob to move the lock toward either direction with the torsion spring or the helical spring being compressed or expanded.

It is a further object of the present invention to configure the lock as a detachable one and which is adapted to assemble together thereafter. This not only enables the lock to accommodate the size of the LCD panel but also enables the lock to have a double hook arrangement or a single hook arrangement. Hence, not only the number and types of the lock molds are decreased for reducing the manufacturing cost but also the management of spare parts, materials, and products is simplified.

The above and other objects, features and advantages of the present invention will become apparent from the following detailed description taken with the accompanying drawings.

DETAILED DESCRIPTION OF THE PREFERRED EMBODIMENTS

Figure 1:
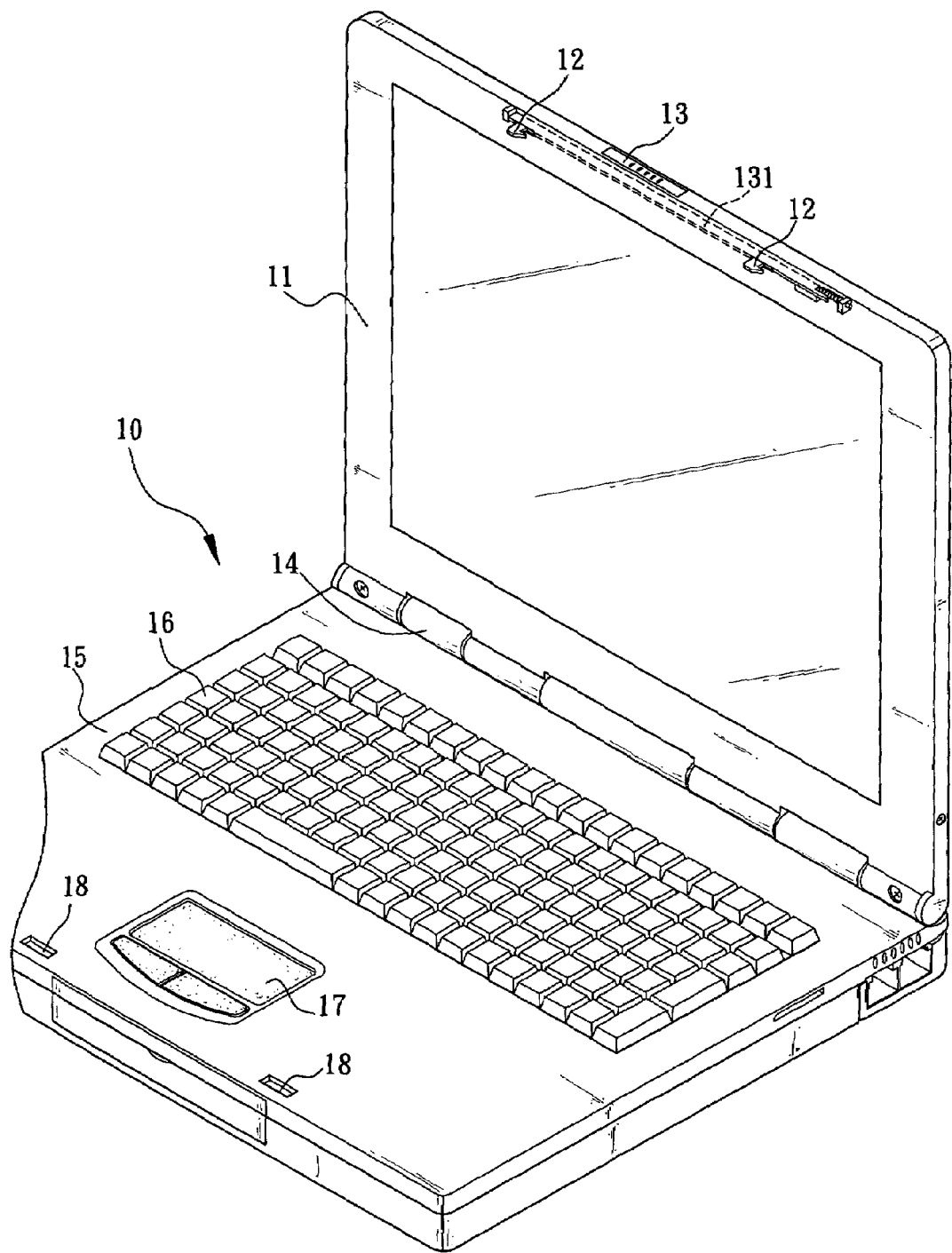
FIG. 1 is a perspective view of a notebook incorporating a conventional lock including hooks mounted on its LCD panel and holes mounted on its case.
Figure 2:
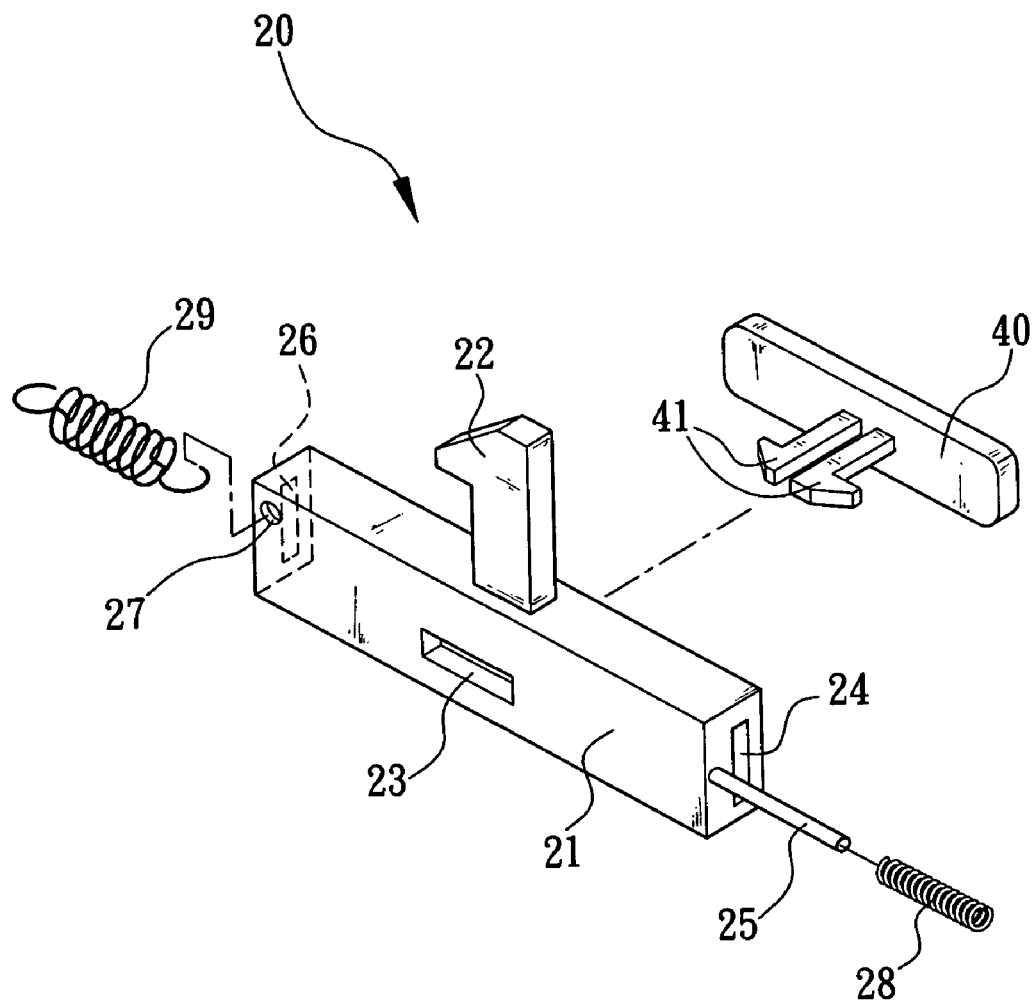
FIG. 2 is an exploded perspective view of a first preferred embodiment of lock for the LCD panel of a notebook according to the invention.
Figure 3:
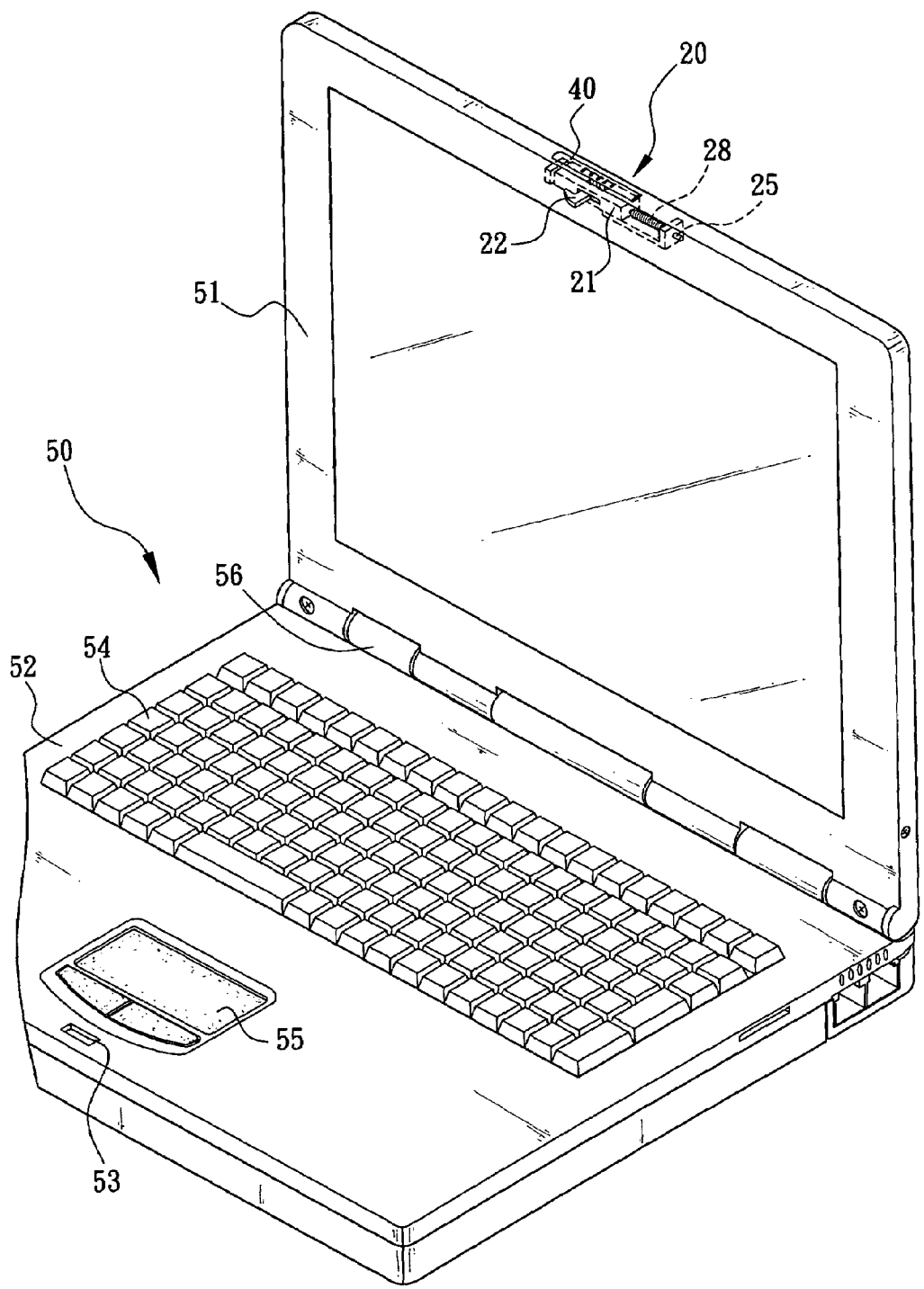
FIG. 3 is a perspective view of a notebook incorporating the lock of FIG. 2 mounted on its LCD panel and a hole mounted on its case.

Referring to FIGS. 2 and 3, a lock 20 for a panel 51 of a portable electronic device 50 in accordance with a first preferred embodiment of the invention is shown. In detail, the lock 20 is mounted on one side of the panel 51 of the electronic device 50. Also, a corresponding hole 53 is formed on a top of a case 52 of the electronic device 50. In the embodiment, the electronic device 50 is a notebook. The panel 51 is implemented as an LCD panel 51. On top of the case 52 there are provided a keyboard 54 and a touch panel 55 both for input purposes. Also, a hinge 56 is provided on the other side of the LCD panel 51. The hinge 56 is pivotably connected to one side of the case 52. In use, a user may pivot the LCD panel 51 about the hinge 56 to open or close the LCD panel 51.

Referring to FIG. 2 again, the lock 20 comprises a latch 21 and a knob 40. A hook 22 is projected from the latch 21 and is perpendicular thereto. A through hole 23 is formed in the latch 21 below the hook 22. A first slot 24 and a pin 25 are provided at one end of the latch 21 and a second slot 26 is provided at the other end thereof. Further, an aperture 27 is provided proximate the second slot 26 at the other end of the latch 21. A torsion spring 28 is put on the pin 25 or a helical spring 29 has a hook end fastened in the aperture 27 for mounting the latch 21. By configuring as above, the lock 20 may cooperate with either the torsion spring 28 or the helical spring 29 in different designs.

Moreover, a latching member 41 is projected from one side surface of the knob 40 (see FIG. 2). The latching member 41 of the knob 40 is adapted to insert through the through hole 23 of the latch 21 to fasten the knob 40 and the latch 21 together. A user may slide the knob 40 to move the lock 20 either toward one direction with the torsion spring 28 or the helical spring 29 being compressed or toward the other opposite direction with the torsion spring 28 or the helical spring 29 being expanded. A linking member (e.g., link) is adapted to have its both ends inserted into the first slot 24 and the second slot 26 at the both ends of the latch 21 for connection purpose as detailed later in the discussion of FIG. 4.

By configuring as above, it is clear that the lock 20 is mounted on one side of the LCD panel 51 (see FIG. 3). The hook 22 and the knob 40 are exposed on a panel surface and an edge of the LCD panel 51 respectively. As shown in FIG. 2, the torsion spring 28 is put on the pin 25 at one end of the latch 21 for anchoring the latch 21 in the LCD panel 51. Alternatively, the helical spring 29 has a hook end fastened in the aperture 27 at the other end of the latch 21 for anchoring the latch 21 in the LCD panel 51. That is, either the torsion spring 28 or the helical spring 29 can be selected to form a single hook 22 configuration depending on designs. Alternatively, two opposite hooks 22 are adapted to form a double hook 22 configuration (not shown). Thus, by providing the lock 20 and the corresponding hole 53 and fastening the LCD panel 51, it is possible of preventing the LCD panel 51 from being opened easily and also is the purpose for anchoring the latch 21 in the LCD panel 51.

Figure 4:
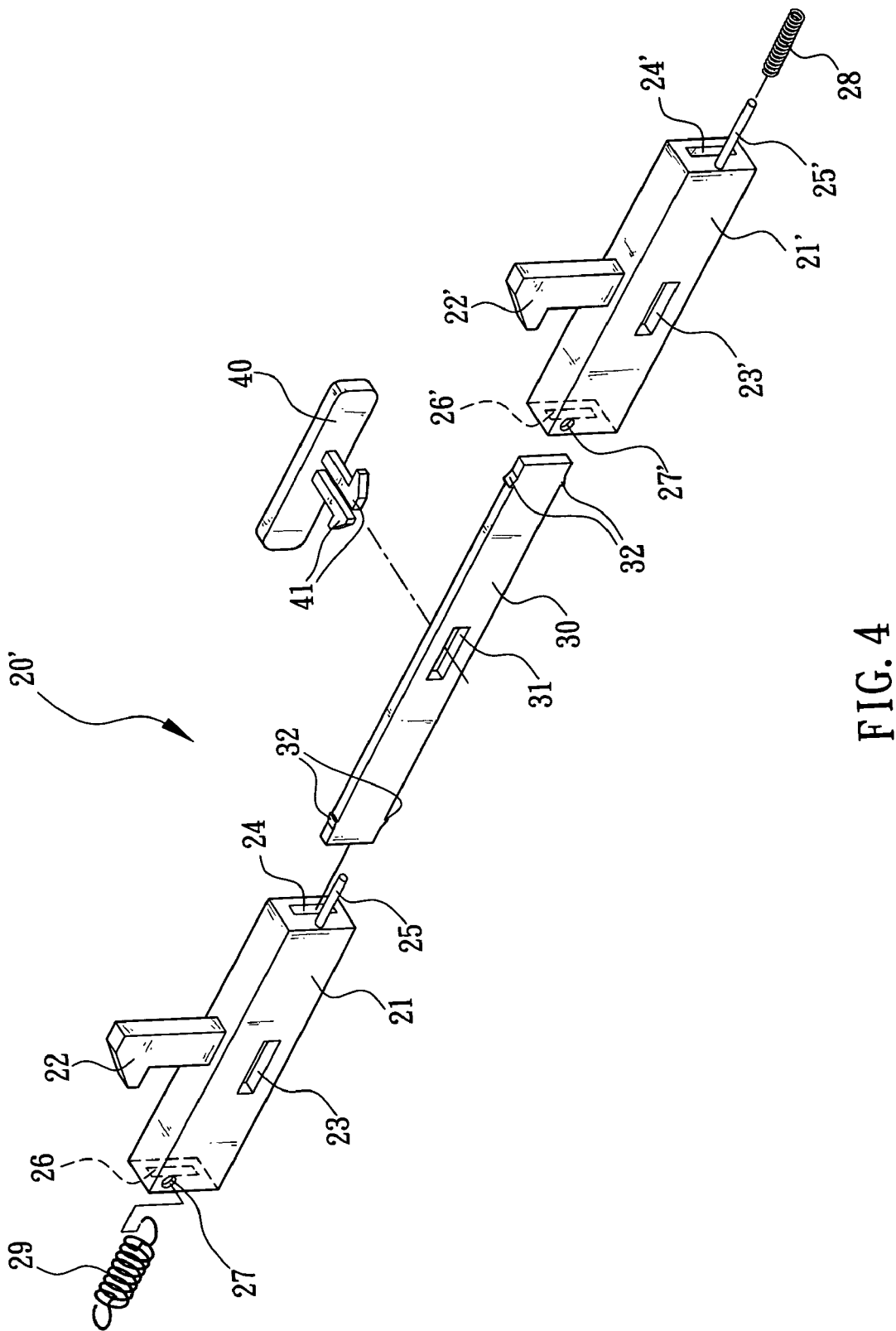
FIG. 4 is an exploded perspective view of a second preferred embodiment of lock for the LCD panel of a notebook according to the invention.
Figure 5:
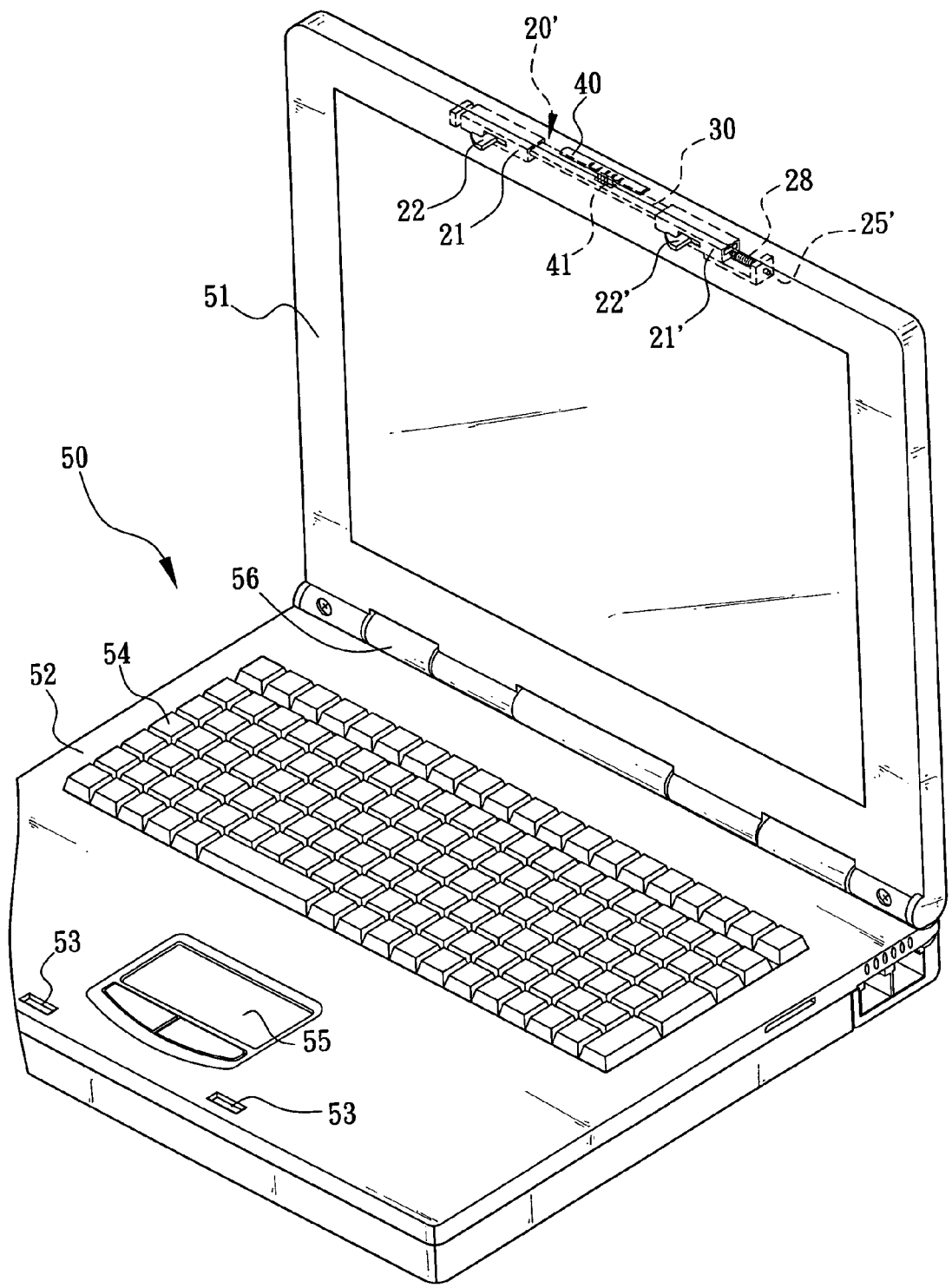
FIG. 5 is a perspective view of a notebook incorporating the lock of FIG. 4 mounted on its LCD panel and holes mounted on its case.

Referring to FIGS. 4 and 5, a second preferred embodiment of the invention is shown. The lock 20' is mounted on one side of the panel 51 of the electronic device 50 (see FIG. 5). Also, corresponding holes 53 are formed on a top of a case 52 of the electronic device 50. On top of the case 52 there are provided a keyboard 54 and a touch pane 55 both for input purposes. Also, a hinge 56 is provided on the other side of the LCD panel 51. The hinge 56 is pivotably connected to one side of the case 52. In use, a user may pivot the LCD panel 51 about the hinge 56 to open or close the LCD panel 51.

Referring to FIG. 4 again, the lock 20' comprises a first latch 21, a second latch 21', a linking member (e.g., link) 30, and a knob 40. A hook 22 is projected from the first latch 21 and is perpendicular thereto. A hook 22' is projected from the second latch 21' and is perpendicular thereto. A through hole 23 is formed in the first latch 21 below the hook 22. A through hole 23' is formed in the second latch 21' below the hook 22'. A first slot 24 and a pin 25 are provided at one end of the first latch 21 and a second slot 26 is provided at the other end thereof. A first slot 24' and a pin 25' are provided at one end of the second latch 21' and a second slot 26' is provided at the other end thereof. Further, an aperture 27 is provided proximate the second slot 26 at the other end of the first latch 21 and an aperture 27' is provided proximate the second slot 26' at the other end of the second latch 21'. A torsion spring 28 is put on the pin 25' or a helical spring 29 has a hook end fastened in the aperture 27 for mounting the first or second latch 21 or 21'. By configuring as above, the lock 20' may cooperate with either the torsion spring 28 or the helical spring 29 in different designs.

Moreover, the linking member 30 comprises a central positioning hole 31, and two opposite fastening members (e.g., hooks) 32 at either end. The fastening members 32 at the other end are adapted to insert into the first slot 24 of the first latch 21 and the fastening members 32 at one end are adapted to insert into the second slot 26' of the second latch 21' for fastening. As an end, a double latch 22 configuration is formed.

Moreover, a latching member 41 is projected from one side surface of the knob 40 (see FIG. 4). The latching member 41 of the knob 40 is adapted to insert through the positioning hole 31 of the linking member 30 to fasten the knob 40 and the linking member 30 together. A user may slide the knob 40 to move the lock 20' either toward one direction with the torsion spring 28 or the helical spring 29 being compressed or toward the other opposite direction with the torsion spring 28 or the helical spring 29 being expanded.

By configuring as above, it is clear that the lock 20' is mounted on one side of the LCD panel 51 (see FIG. 5). The hooks 22 and 22' and the knob 40 are exposed on a panel surface and an edge of the LCD panel 51 respectively. The helical spring 29 has a hook end fastened in the aperture 27 at the other end of the first latch 21 for anchoring the first latch 21 in the LCD panel 51. Alternatively, the torsion spring 28 is put on the pin' 25 at one end of the second latch 21' for anchoring the second latch 21' in the LCD panel 51. That is, either the torsion spring 28 or the helical spring 29 can be selected to form a double hook 22 and 22' configuration depending on designs (see FIG. 4). Thus, it is possible of preventing the LCD panel 51 from being opened without permission by providing the lock 20' and the corresponding holes 53 and fastening the LCD panel 51.

In brief, the locks 20 and 20' are configured as detachable ones and are adapted to assemble together thereafter as contemplated by the invention. This not only enables the lock to accommodate the size of the LCD panel 51 but also enables the lock to have a double hook 22 and 22' configuration or a single hook 22 configuration (see FIGS. 2 and 4). By utilizing the invention, not only the number and types of the lock molds 20 and 22' are decreased (i.e., the manufacturing cost reduced) but also the management of spare parts, materials, and products is simplified. In conclusion, the invention has a high level of technical merit.

While the invention herein disclosed has been described by means of specific embodiments, numerous modifications and variations could be made thereto by those skilled in the art without departing from the scope and spirit of the invention set forth in the claims.

What is claimed is:

1. A lock mountable on an LCD panel of an electronic device including a case having a corresponding hole formed thereon for lockingly engaging the lock, the lock comprising:
    a latch including a projected hook being perpendicular thereto, a through hole formed therein below the hook, a first slot and a pin both provided at its one end, a second slot provided at its other end, and an aperture provided proximate the second slot at the other end wherein either a torsion spring is put on the pin or a helical spring has a hook end fastened in the aperture;
    a linking member adapted to have its both ends inserted into the first slot and the second slot of the latch; and
    a knob including a latching member projected from its side surface, the latching member being adapted to insert through the through hole of the latch to fasten the knob and the latch together.

2. The lock of claim 1, wherein the linking member is a link.

3. A lock mountable on an LCD panel of an electronic device including a case having two spaced corresponding holes formed thereon for lockingly engaging the lock, the lock comprising:
    first and second latches each including a projected hook being perpendicular thereto, a through hole formed therein below the hook, a first slot and a pin both provided at its one end, a second slot provided at its other end, and an aperture provided proximate the second slot at the other end wherein either a torsion spring is put on the pin of the first latch or a helical spring has a hook end fastened in the aperture of the second latch;
    a linking member including a positioning hole, the linking member being adapted to have its both ends inserted into the first slot of the first latch and the second slot of the second latch for forming a double hook arrangement; and
    a knob including a latching member projected from its side surface, the latching member being adapted to insert through the positioning hole of the linking member to fasten the knob and the linking member together.

4. The lock of claim 3, wherein the linking member further comprises at least one fastening member at either end.

5. The lock of claim 4, wherein the linking member is a link.

6. The lock of claim 4, wherein the fastening member is a hook.

* * * * *